United States Patent

Brickhouse et al.

[15] 3,642,307
[45] Feb. 15, 1972

[54] QUICK-RELEASE COUPLING

[72] Inventors: Abner A. Brickhouse; Dirk A. Schipper, both of P.O. Box 28, Sidon, Lebanon

[22] Filed: Sept. 26, 1969

[21] Appl. No.: 861,428

[52] U.S. Cl. ...............................285/38, 285/91, 285/364, 285/320, 285/420, 285/24
[51] Int. Cl. ...........................................F16l 37/12
[58] Field of Search..................285/364, 91, 406, 362, 38, 285/363, 405, 33, 34, 35, 310, 309, 308, 305, 420, 421, 1

[56] References Cited

UNITED STATES PATENTS

| | | | |
|---|---|---|---|
| 1,233,170 | 7/1917 | Berry | 285/363 X |
| 1,484,216 | 2/1924 | Hekking | 285/406 |
| 1,641,839 | 9/1927 | Cain et al. | 285/405 X |
| 1,910,706 | 5/1933 | Malzard | 285/38 X |
| 2,324,792 | 7/1943 | Meyer | 285/38 X |
| 2,536,602 | 1/1951 | Goett | 285/364 X |
| 2,645,506 | 7/1953 | Sturgis | 285/364 X |
| 3,489,434 | 1/1970 | Haley | 285/364 X |
| 3,494,641 | 2/1970 | Caregnato | 285/364 X |

*Primary Examiner*—Thomas F. Callaghan
*Attorney*—McLean, Morton and Boustead

[57] ABSTRACT

A quick-release coupling for a pair of conduits in which the base of the fastener holding the conduits joined is partible to provide rapid release of the connection between the conduits in an emergency.

4 Claims, 6 Drawing Figures

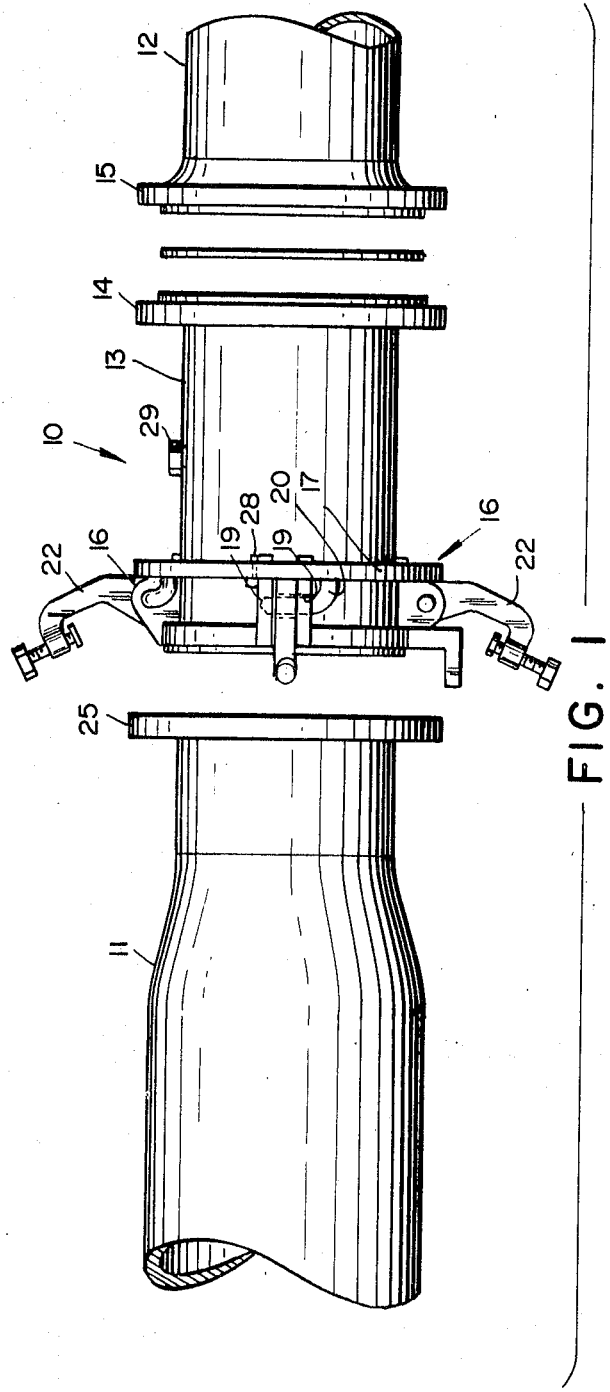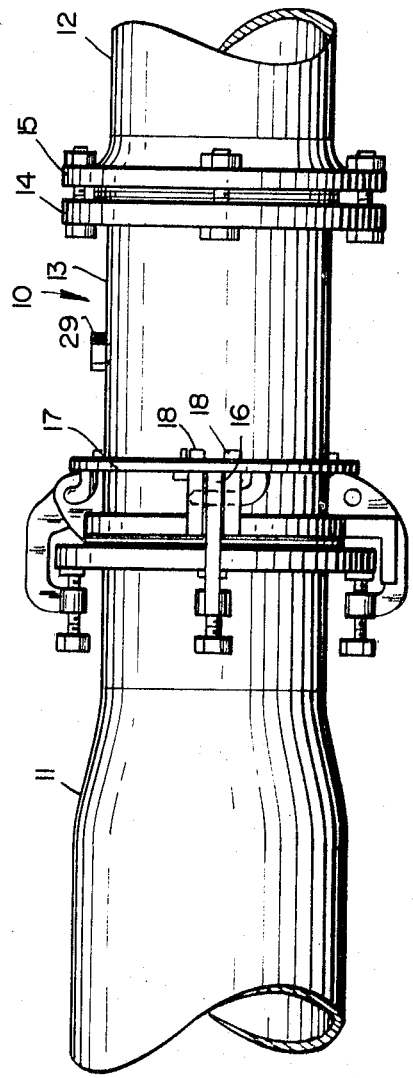
FIG. 1
FIG. 2
INVENTORS
ABNER A. BRICKHOUSE
DIRK A. SCHIPPER
BY
McLean, Morton and Boustead
ATTORNEYS

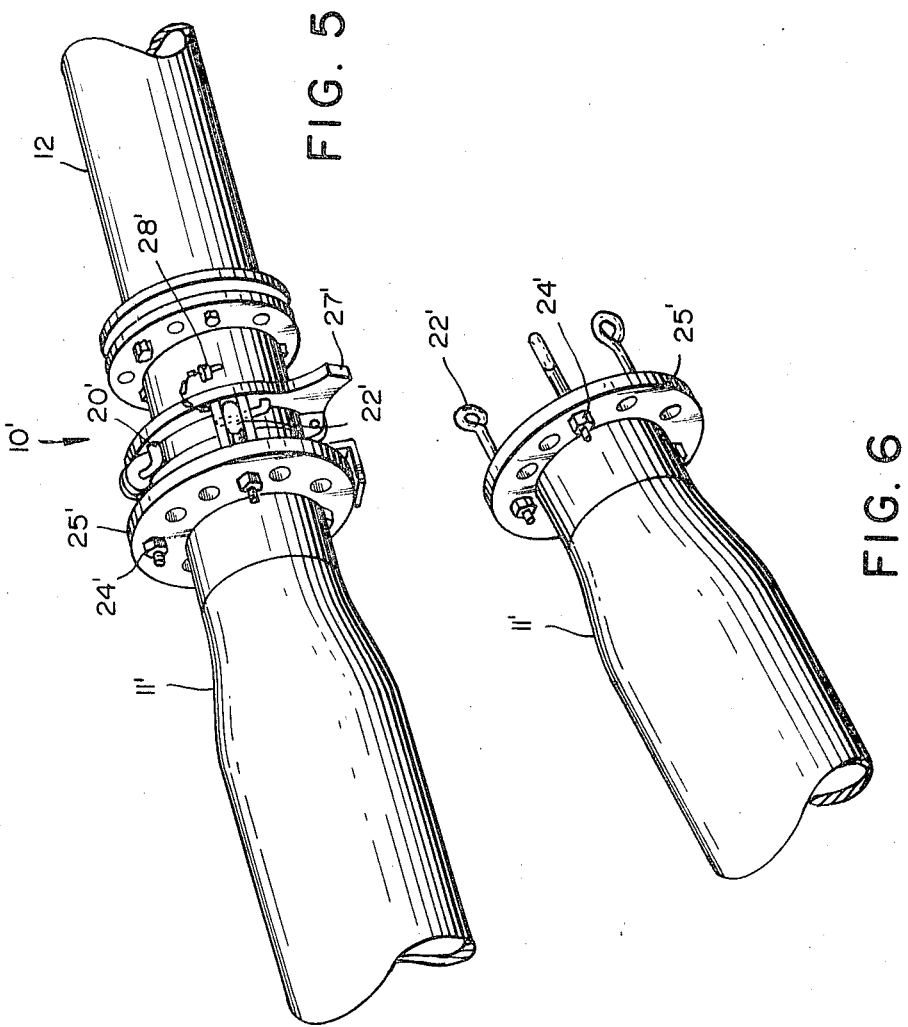

QUICK-RELEASE COUPLING

BACKGROUND OF THE INVENTION

1. Field of the Invention

This invention relates to conduit connection and primarily to a quick-releasing coupling to be used in the connection of fluid conduits.

2. Description of the Prior Art

In most oil-handling marine terminals it is desirable to be able to disconnect quickly the oil conduit between a marine craft and a permanent installation. A quick-release coupling is necessary in the event of a marine craft moving away from its proper position as could be caused by a sudden storm or surge of the vessel or in the event of a fire on the ship or on the nearby facility. A conventional coupling usually requires bolts to be inserted between both flanges thereby necessitating the subsequent loosening of the flange bolts before uncoupling can be accomplished. In order to insure the safety of the tanker and its personnel, it is often necessary, under emergency conditions, for the tanker to leave its mooring before the conduit can be uncoupled, consequently causing large material losses.

One quick-release device permitting rapid release of an offshore loading or unloading tanker is described in Brickhouse U.S. Pat. No. 2,904,353. That device has particular utility where the submarine hose is pulled vertically for connection alongside the tanker. With the adoption of over-the-rail connections, however, need has risen for such a device which can connect horizontally mounted conduits.

It is therefore the principal object of this invention to provide a coupling for connecting a pair of conduits which can be rapidly released in an emergency and which can be utilized to connect horizontally mounted conduits.

SUMMARY OF THE INVENTION

This invention broadly is a coupling for securing the connection between a pair of conduits in a manner which permits their rapid separation when desired. The coupling is designed to secure the pair of conduits butted end against end and includes a fastener base mounted on the conduit end section of one of the conduits which base forms a point of attachment for a fastener utilized to hold the other conduit end against the first conduit end. In accordance with the invention the fastener base is partible and includes two relatively movable parts, one of which is fixed to the conduit end section and the second of which is mounted for movement on the end section between a first, engaged, position holding the fastener secure and a second, disengaged, position in which the fastener is released. A releasing device in the form of a ring or other rotatable element is mounted on the conduit end section, with the second part of the fastener base secured to it. Normally the releasing device is retained in a position such that the fastener base parts are engaged in position holding the fastener securely. Attachment of the two conduit ends is made utilizing the fastener in a conventional manner. When, however, rapid release of the connected conduits is required, the release device can be struck or otherwise rotated from its normal position to cause the fastener base parts to separate, releasing the fastener at its point of attachment to the conduit end section and thereby releasing the conduits.

In most practical cases, the coupling device of this invention is used to join pipes and other conduits having flanged ends and therefore is conveniently constructed as a short conduit section on which the fastener base, fastener and releasing device are mounted and which section is desirably mounted on the end of one of the pair of conduits to be joined to form an end section on such conduit. Typically the fastener is of a type which engages a conduit flange, e.g., clamp or bolt and nut. Generally several fasteners are used distributed about the conduit in order to distribute uniformly the clamping forces holding the pair of conduits together. When several such fasteners are employed, each should have its own associated fastener base. A common releasing device for all the fastener bases, however, is used to provide simultaneous parting action when rapid release is desired.

As release of conduit pressure is normally desired before breaking conduit connection, even when effecting rapid release, there is also desirably provision for pressure gauge which enables the operator to determine when the pressure in the line has dropped so as to allow him safely to release the quick-release device.

For a more complete understanding of the practical application of the principles of this invention, reference is made to the appended drawings in which:

FIG. 1 is an elevation showing a quick-release coupling according to the invention placed between two large conduits prior to attachment of the conduits;

FIG. 2 is a view similar to FIG. 1 showing the quick-release coupling of FIG. 1 tightened in position to attach the conduits;

FIG. 5 is an isometric view similar to FIG. 3 showing another embodiment of the quick-release device of the invention in the attached position; and FIG. 6 is an isometric view showing a portion of the coupling of FIG. 5 after release has been accomplished.

Figure 3:
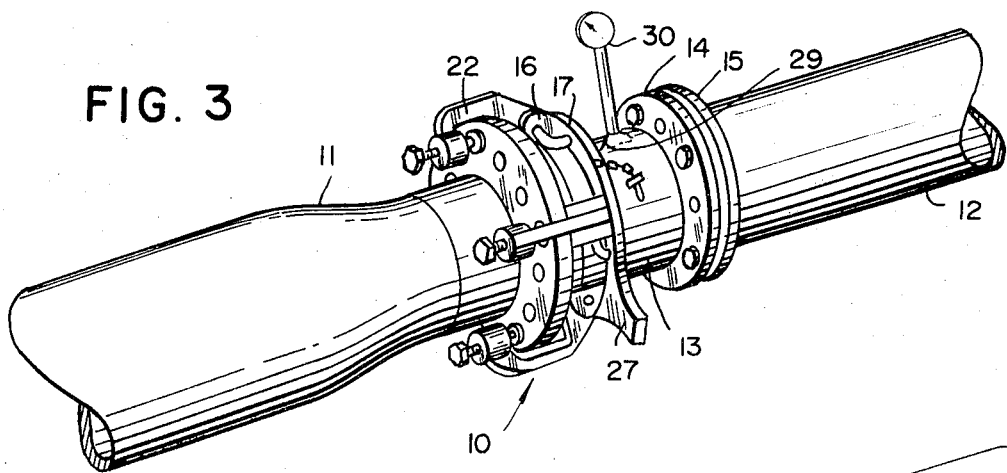
FIG. 3 is an isometric view of the coupling tightened in position.

Referring to FIGS. 1–4, the reference numeral 10 indicates a quick-release coupling in accordance with the invention used to join a conduit 11 connected to the manifold of a tanker and the like with a hose 12 located dockside at a permanent location.

Coupling 10 basically includes a short conduit section 13 which is flanged at one end as indicated at 14 to permit it to be connected to hose 12 by attachment to a flange 15 on the end of hose 12 by bolts and nuts or the like suitably gasketed to provide a sealed joint, such that conduit section 13 forms an end section mounted on hose 12. Normally coupling 10 is kept at the dock, and it is thus unnecessary to carry one or more couplings 10 as equipment aboard each tanker.

Coupling 10 further includes four clamp bases 16 and a release ring 17 which are mounted on section 13 adjacent its end remote from hose 12. Each clamp base 16 includes a pair of lugs 18 mounted in side-by-side relationship affixed to section 13 which have aligned apertures 19, such that each associated pair of lugs 18 form a trunnion for receiving a pin 20 which forms the other part of clamp base 16. Each pin 20 has an end secured in ring 17 with all four pins 20 aligned in the same sense with respect to the circumference of section 13 and hence with respect to ring 17. Thus ring 17 can be rotated to a limiting position in one direction in which each of pins 20 is received engaged through the apertures 20 in its associated pair of lugs 18. Ring 17 can be rotated on section 13 in the reverse direction to disengage each of pins 20 simultaneously from its associated lugs 18.

Finally, coupling 10 includes four C-clamps 22 each of which is apertured at one end, as indicated by the reference numeral 23, and carries a threadedly adjustable anvil 24 at its other end. Clamps 22 are mounted, one associated with each clamp base 16, by positioning the apertured end of each clamp 22 between the pair of lugs 18 associated with a base 16 and by rotating ring 17 to engage pins 20 which are received through apertures 23. A retaining pin, such as a cotter pin 28, is positioned through ring 17 at a position forming a stop (by abutment against a lug 18) to retain ring in such engaged position.

As shown particularly with reference to FIGS. 1 and 2, attachment to the flanged end 25 of conduit 11 is made by bringing end 25 into abutting contact with the end of section 13 removed from its flange 14. To facilitate this the underside portion of section 13 can carry a pair of ears 26 on which the underside of flange 25 can be rested such that ears 26 form conduit alignment guides. Clamps 22 are then pivoted about pins 20 to carry their adjustable anvils 24 over flange 25 against which anvils 24 are then tightened to secure connection between conduit 11 and hose 12.

Figure 4:
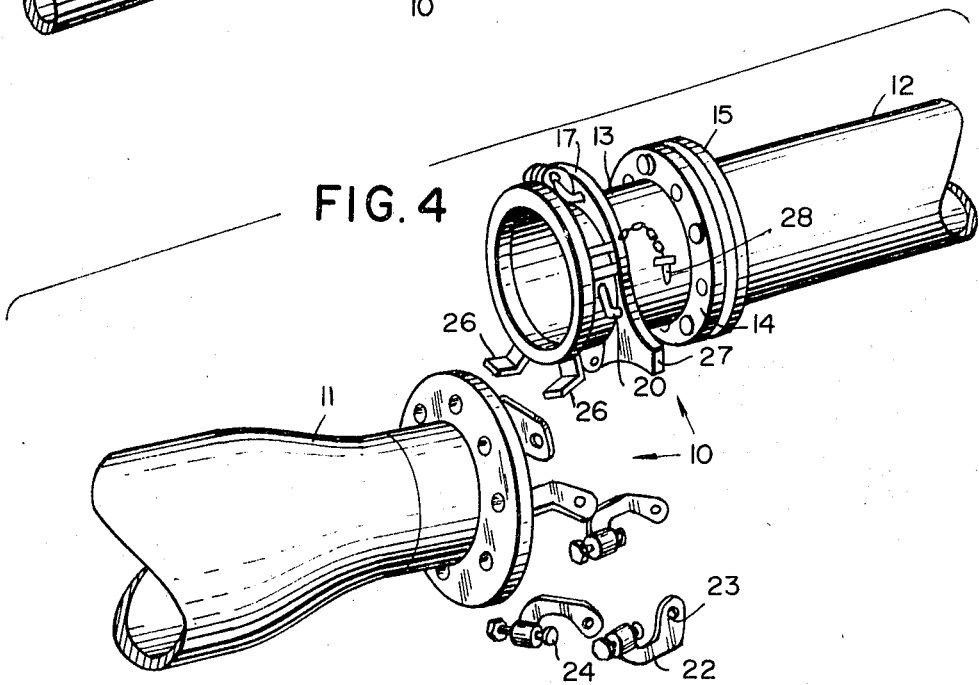
FIG. 4 is a view similar to FIG. 3 but showing the coupling after release has been accomplished.

In the event that emergency release is required, hose 12 can be separated from conduit 11 without reversing the laborious and relatively slower process of connection described above by the simple expedient of shutting down flow of fluid in the conduits to release pressure, removing cotter pin 28 and thereafter rapidly rotating ring 17 out of its engaged position. A boss 29 is mounted on coupling 10 carrying a pressure gauge 30 to facilitate advising the operator at the location of the fact of pressure release. Desirably, ring 17 carries a projecting lug 27 which can be struck with a sledge or other heavy instrument to facilitate disengagement of pins 20 of ring 17, thus parting the elements forming clamp bases 16 and releasing clamps 22 at their points of attachment to conduit section 13. Lug 27 should be positioned on the side of coupling 10 such that downward movement of lug 27 will produce the proper direction of rotation of ring 17. With no further restraining forces holding conduit 11 against section 13, these two part with clamps 22 flying apart, as shown in FIG. 4.

This entire releasing operation is accomplished in nineteen seconds or less. If time permits after the conduit is released, it is plugged to prevent any further oil loss.

It will be apparent when the emergency requiring such rapid release has ceased the fallen C-clamps 22 can be recovered from the deck of the tanker or dock, and the coupling 10 reassembled for further use when required. The coupling 10 described above is not entirely suitable for permanent or semipermanent installation in an installation utilizing a submarine delivery hose, as, for example, in a submarine hose connected to a single point mooring system. A modification of the coupling of the present invention suitable for attachment to the end of a submarine hose for loading oil or other materials is described with reference to FIGS. 5 and 6. In these FIGS., the same reference numerals are employed as are utilized in FIGS. 1–4 with the same significance and understanding. Hose 11' typifies a submarine hose such as might be utilized in connection with a single point mooring system. In the embodiment shown in FIGS. 5 and 6, a coupling 10' is utilized to connect the ship manifold conduit 12 with the submarine hose 11' in place of coupling 10. Basically, coupling 10' differs in that in place of C-clamps 22, there are employed eyelet bolts 22' which extend through appropriate bolt holes in hose flange 25' and are secured by nuts 24'. In this embodiment, coupling 10' can be attached as a semipermanent installation to submarine hose 11' and lowered into the sea when not in use, when a rapid disconnection is required the eyelet bolts 22', instead of dropping free as clamps 22, are retained connected to the separated conduit section.

We claim:

1. A quick-release coupling for a pair of conduits which includes a fastener base mounted on the end of one of the said conduits to form a point of attachment for a fastener, said fastener base including two relatively movable parts, one affixed to said conduit and a second part relatively movable between a first engaged position with respect to said first part and a second disengaged position with respect to said first part, movable release means mounted on said conduit, said second part of said fastener base being secured to said release means for movement therewith between said positions and fastener means attached to said fastener base in said first position of said release means and disengaged therefrom in said second position of said release means.

2. A quick-release coupling according to claim 1 in which said fastener includes a C-clamp.

3. A quick-release coupling according to claim 1 in which said fastener includes an eyelet bolt.

4. A quick-release coupling according to claim 1 in which said release means is a ring mounted about said conduit.

* * * * *